Jan. 17, 1950     L. N. AFTON ET AL     2,495,047
FILM OR PLATE VIEWER HAVING A TELESCOPING CASING
Filed May 31, 1946     2 Sheets-Sheet 1
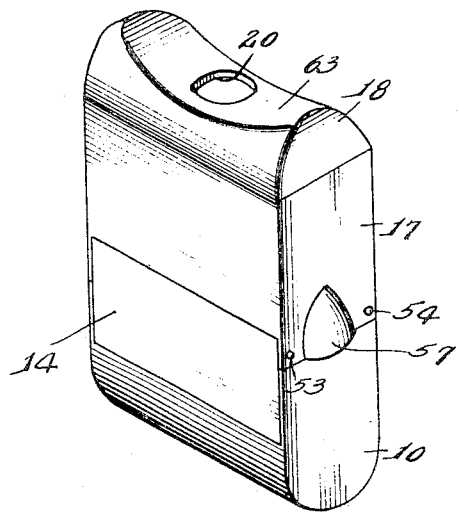
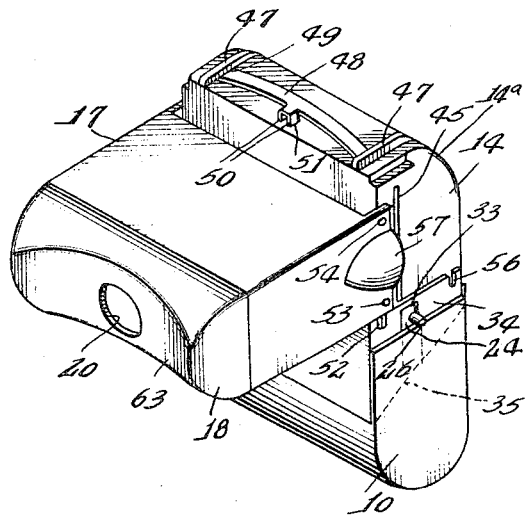
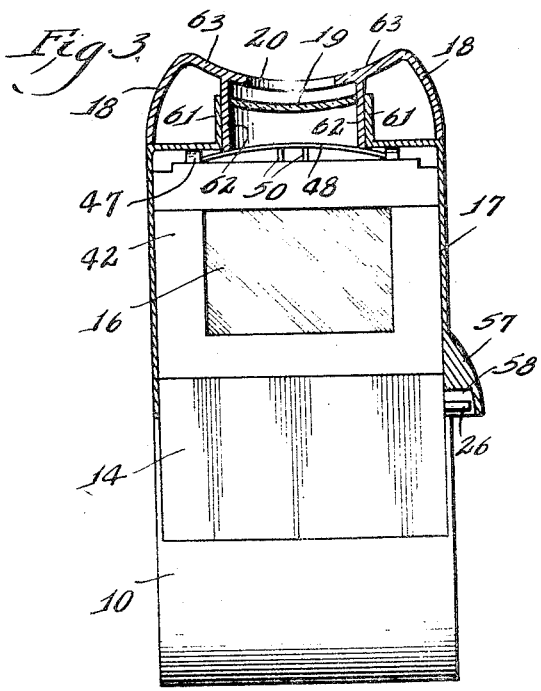
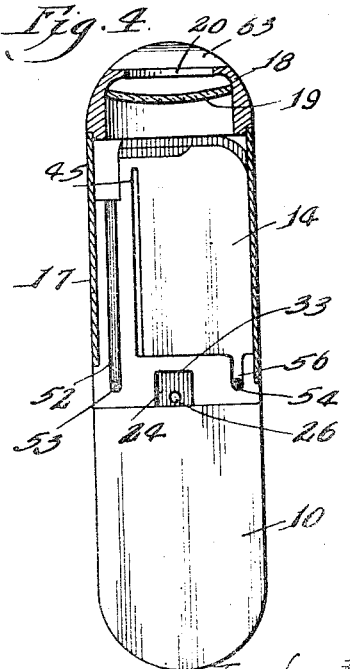
Inventors:
Leonard N. Afton,
Seymour Kaufman
By: Kent W. Worrell
Attorney

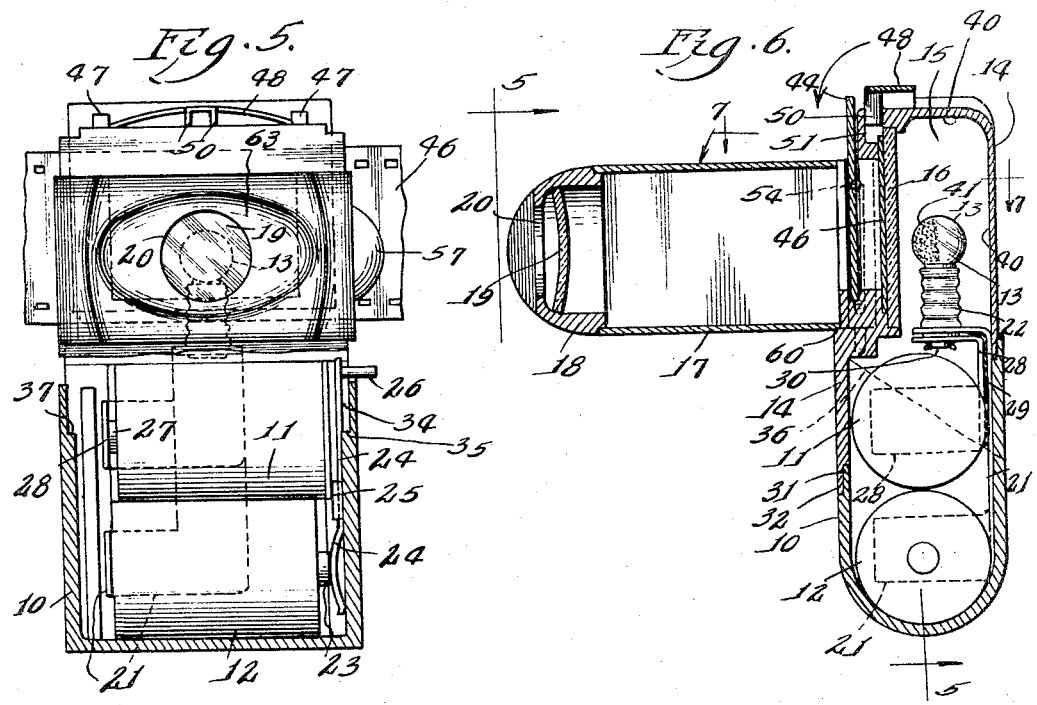
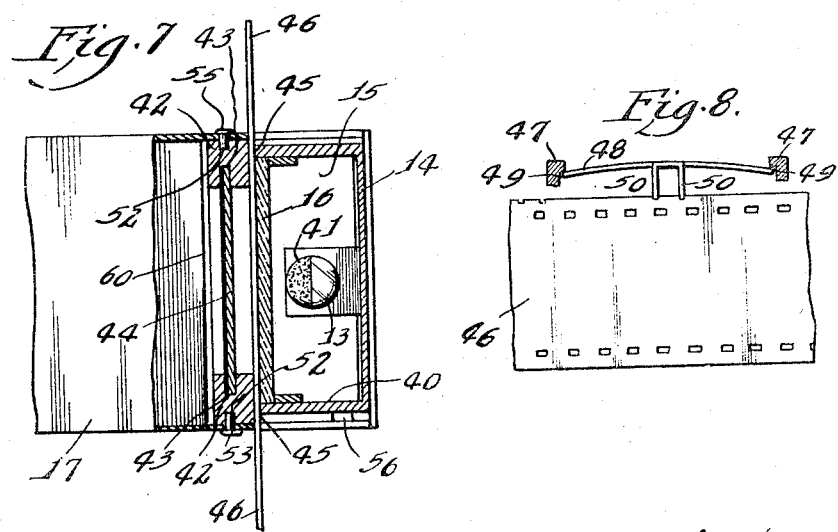

Patented Jan. 17, 1950

2,495,047

UNITED STATES PATENT OFFICE 2,495,047

FILM OR PLATE VIEWER HAVING A TELESCOPING CASING

Leonard N. Afton and Seymour Kaufman, Chicago, Ill., assignors to Arcadia Manufacturing Company, a corporation of Illinois Application May 31, 1946, Serial No. 673,644

1 Claim. (Cl. 88—14)

This invention relates to a portable film and plate viewer of a foldable type adapted to be collapsed into a compact arrangement for carrying it in the pocket and readily extensible for use whenever desired.

An important object of the invention is to provide a simple folding structure adapted to contain a battery energized lamp arranged in compact relation for carrying it and freely movable for extending a portion of the apparatus so that either a plate or a film may be illuminated and examined.

Other objects of the invention are to provide an adjustable focusing lens; to mount one portion of the device so that it is movable with respect to the other and forming a viewing chamber when thus extended; to provide a compact container for a plurality of batteries arranged to connect the batteries in series for illuminating an electric lamp; to provide means for marking a film in viewing position; to provide a protected switch button for connecting the lamp to the batteries and for preventing the accidental operation of the switch, and in general to provide the construction herein shown and described.

Other objects of the invention will appear in the specification and will be apparent from the accompanying drawings in which, Fig. 1 is a perspective view of a viewer in accordance with this invention in assembled or closed portable condition;

Fig. 2 is a perspective view of the construction shown in Fig. 1 in extended or viewing position;

Fig. 3 is a side elevation of the construction as shown in Fig. 1 with an upper portion in section;

Fig. 4 is an end elevation of the structure as shown in Fig. 1 with the upper portion shown in section;

Fig. 5 is a view on the line 5—5 of Fig. 6;

Fig. 6 is a sectional view of the structure as shown in Fig. 5;

Fig. 7 is a part sectional view as taken on the line 7—7 of Fig. 6; and

Fig. 8 shows the engagement of the marking device with a film in operating the viewer.

To show or examine a photographic film or plate, it is customary to use a viewing device which may be employed in connection with or separately from an electric lamp or other source of light supply. Such examinations may be for the purpose of determining whether a picture is to be printed from a film or plate, or the device may be used simply to show or display a number of films or plates.

The present invention is designed and intended to provide a small and compactly foldable portable device which not only contains a lamp and a source of illumination therefor, but also provides a readily extensible viewing shell normally parallel with the main body of the device but movable at an angle thereto into picture viewing position, at the same time uncovering a switch which may be closed at will to light a lamp on the interior of the structure so that by applying the viewing portion of the device to one or both eyes, a film or a plate inserted in the structure may be easily seen, examined, and a film marked for subsequent printing or for discarding it, as desired. The device also includes an adjustable eye piece with a lens which may be varied in position with respect to a plate or film disposed closed to a diffusing ground glass which is illuminated by an electric lamp.

Referring now more particularly to the drawings, the present invention comprises a small light-weight casing having separable parts preferably made of strong light-weight material such as wood, thin metal, or a light-weight plastic. The main parts comprise a base 10 for receiving and holding batteries 11 and 12 and an electric lamp 13; an intermediate casing 14 having a light compartment 15 into which the lamp projects, with a ground glass 16 at one side thereof, an upper casing 17 for partially enclosing the intermediate casing 14 in the folded position, the upper casing being extensible at an angle in front of the ground glass 16; and an adjustable eye piece 18 at the top or outer end of the upper casing part 17 having a lens 19 adjacent an eye viewing opening 20.

In mounting the batteries 11 and 12 in the casing part 10, there is a spring contact strip 21 which extends from one end where it engages the corresponding end of the lower battery 12 and thence along the side toward the top of this casing part where it provides a support for an outer contact shell 22 of the lamp 13. The other end of the lower battery has a central contact 23 which is engaged by a spring strip 24 extending below an insulating cross piece 25 and the upper end being freely movable with a projection 26 secured thereto and extending outwardly from the side of the casing.

The upper battery 11 has a central projection 27 at one end engaging a spring contact spring 28 which extends therefrom to the side of the casing adjacent the other spring strip 21 from which it is spaced by an insulating strip 29, the upper end of this strip 29 engaging a central contact terminal 30 for the lamp 13. The other end of the battery 11 engages the insulating cross piece 25 for holding this extremity of the battery normally out of contact with the conductor 24 but sufficiently close thereto so that when the projection 26 is pressed inwardly, an electrical connection is made between the contact strip 24 and the end or outside of the casing of the battery 11.

With this construction, a circuit is closed through the batteries in series whenever the projection 26 of the contact strip 24 is pressed inwardly. This circuit is traced from the outer shell of the lamp 22 through the spring contact strip 21 to one end of the battery 12, thence through central contact 23 and contact strip 24 to the outer casing end of battery 11, and thence to the central contact 27 of battery 11 and contact strip 28 to the central contact 30 of the lamp 13.

One side of the lower casing extends up to above the mounting for the lamp 22, but the other side of the casing has an inner lip 31 which is engaged by an outer lip 32 of the intermediate casing section 14 which extends downwardly over that side overlapping the lip 31. This provides a space at the adjacent side of the lower casing part for inserting and removing the batteries between the lip 31 and the lamp mounting.

In the lower edge of the intermediate casing 14 at one end thereof is a recess 33 which extends freely over the switch projection 26, the adjacent end 34 of the intermediate casing extending between the spring strip 24 and the adjacent end of the lower casing 10 and having a lower angular contact edge 35 between these portions of the casing. At the other end of the casings is an oppositely inclined contact edge 36 which makes a close contact with a corresponding inclined shoulder 37 on the lower casing 10.

In the upper portion of the intermediate casing, the light compartment 15 preferably has a white or reflecting inner surface 40 and the lamp 13 therein has an opaque coating 41 at the side adjacent the ground glass 16 so that the light from the lamp will be as much diffused as possible for the ground glass. At the outer side of the intermediate casing 14 and in front of the ground glass 16 are guides 42 each having an inside slot 43 open from the top into which a film plate 44 of glass, or other material may be inserted in front of the ground glass 16, and at the inner edges of these guides where they adjoin the ends of the casing are slots 45 directly in front of the ground glass 16 so that a thin film 46 such as camera or motion picture film may be inserted, held tightly against the ground glass 16 and moved freely from side to side through the intermediate casing.

At the top of the intermediate casing and mounted between ribs 47 is a spring strip 48, the ends of which engage in recesses 49 undercut at the lower edges of the ribs for holding the spring strip in place. Intermediate the ends of this strip are downwardly turned prongs 50 extending through slots 51 in the top of the casing section 14, the slots extending below the upper edge of a film 46 so that as the spring strip 48 is depressed, the lower extremities of the prongs will engage the upper edge of the film to mark or designate it. This may be for the purpose of indicating that that particular picture or portion of the film has been examined, or that that particular picture is to be printed, or that that particular picture may be discarded. When pressure on the spring strip 48 is released, it moves upwardly freeing the prongs 50 from engagement with the edge of the film 46.

To mount the casing section 17 for sliding and telescoping movement and rotatably with respect to the intermediate casing 14, the outer edges of the guides 42 each have a groove 52 therein for receiving mounting projections 53 and 54 at one side of the casing 17 and 55 at the other side of this casing. Projections 53 and 55 are at opposite sides in alignment and constitute pivots about which the casing section 16 may be swung over and from the outer end of casing 14, the opposite side of this casing 14 having a rounded portion 14a as shown more clearly in Fig. 2 about which the upper edge of the casing 17 is swung when the projection 54 is raised from its engagement with its slot 52 so that this side or portion of the casing 17 will swing over the rounded top edge 14a of the intermediate casing section, the outer casing section 17 then telescoping over and sliding downwardly to cover the intermediate casing 14 until the projection 54 engages in a notch 56 at the opposite side of the intermediate casing 14 from the groove 52 thereby seating the casing section 17 in collapsed relation over the intermediate section. In this folded condition, the spring strip 48 will fit up closely below the eye piece 18 as shown more clearly in Fig. 3.

At that side of the casing section 17 which is adjacent the battery switch projection 26, an outwardly rounded extension 57 projects at the edge of the casing 17 having an undercut recess 58 therein to receive and protect the projection 26 so that whenever the outer casing 17 is in collapsed or telescopic engagement over the intermediate casing section 14, it is impossible to engage or operatively depress the switch contact strip 24 by engagement of the switch projection 26. Whenever the casing sections are in compact or telescopic relation, there is no necessity for lighting the lamp 13 and accidental closing of the switch is therefore prevented.

To properly seat the outer casing section 17 in viewing position, the intermediate casing has a ledge or shoulder 60 below the window opening for the ground glass 16 upon which the lower edge of the casing 17 engages, thereby holding the outer casing 17 in proper extending position at right angles to the intermediate casing 14 and directly in front of the window opening for the ground glass 16.

To mount the eye piece 18 for focusing and adjusting movement, the outer end of the telescopic casing part 17 has opposite curved outer projections 61 partially defining a circular opening and for receiving inwardly thereof a circular shell 62 projecting inwardly from the outer edge of the eye piece 18 so that the eye piece may be moved inwardly and outwardly thereof, the ends of the circular projections 61 limiting the movement of the eye piece substantially to an inwardly and outwardly adjusting direction. The extremity of the eye piece is also preferably curved and depressed, inwardly forming a circular seat 63 surrounding the viewing opening 20 so that the eye piece may be applied in close fitting relation around the eye of an observer.

With this construction, the separate parts are fitted closely together in sliding frictional relation so that the apparatus is compactly contained when not in use adapting it to be carried by hand, in a pocket, or in any location where a small space is afforded. In this position, all of the parts are enclosed, contained and protected so that they are not subject to wear, damage, or objectionable contact with each other or with any outside part. The viewing apparatus may be easily and quickly extended for use by moving the outer casing outwardly until it can be rotated over the end of the intermediate casing and seated in front of the viewing window at right angles to the top of the intermediate casing, the outer casing in this position uncovering both the slots 43 for receiving a film or plate from the top of the device and the slots 45 for inserting a film transversely in front of the ground glass.

When a film or plate is in viewing position, the eye piece may be applied around the eye of a user and the switch projection 26 depressed closing the electrical circuit for lighting the lamp 13. If it is found that the picture is not exactly in focus, the eye piece may be adjusted correspondingly and to select or distinctively mark a film the spring strip 48 is depressed thereby marking the edge of the film accordingly.

This device is small and compact so that it may be held in one hand during the viewing movement with one finger or the thumb to engage the circuit closing projection 26 and one of the fingers to engage the spring strip 48.

Although a preferred construction of the invention is shown and described in detail, it should be regarded as an exemplification rather than a limitation of the invention since various changes in the construction, combination, and arrangement of the parts may be made without departing from the spirit and scope of the invention.

We claim:

A foldable film and plate viewer having a casing part with illuminating means therein adjacent one end and with batteries for the illuminating means in the casing adjacent the other end, means for guiding a film in front of the illuminating means, a switch comprising a projection extending from one side of the casing to close a lighting circuit from the battery to the illuminating means, and a telescoping casing part movable from a position at right angles in front of the illuminating means to a closing position slidable over the end of the first casing part and overlying the illuminating means and with a recess projection at its inner telescoping edge which overlies the switch projection to prevent closing the illuminating circuit when the telescoping casing is in position over the illuminating casing, the telescoping casing having an aperture at its outer end for viewing a film lighted by said illuminating means when the casing is in extended position.

LEONARD N. AFTON.
SEYMOUR KAUFMAN.

REFERENCES CITED

The following references are of record in the file of this patent:

UNITED STATES PATENTS

| Number | Name | Date |
|---|---|---|
| 1,066,848 | Ruttan et al. | July 18, 1913 |
| 1,184,110 | Linder | May 23, 1916 |
| 1,291,710 | Arter | Jan. 21, 1919 |
| 1,729,660 | Farmer | Oct. 1, 1929 |
| 1,865,028 | Mallina | June 28, 1932 |
| 1,866,587 | Warren | July 12, 1932 |
| 2,065,307 | Fullmer | Dec. 22, 1936 |
| 2,419,339 | Dennis | Apr. 22, 1947 |
| 2,422,816 | Baia | June 24, 1947 |